Patented Mar. 30, 1926.

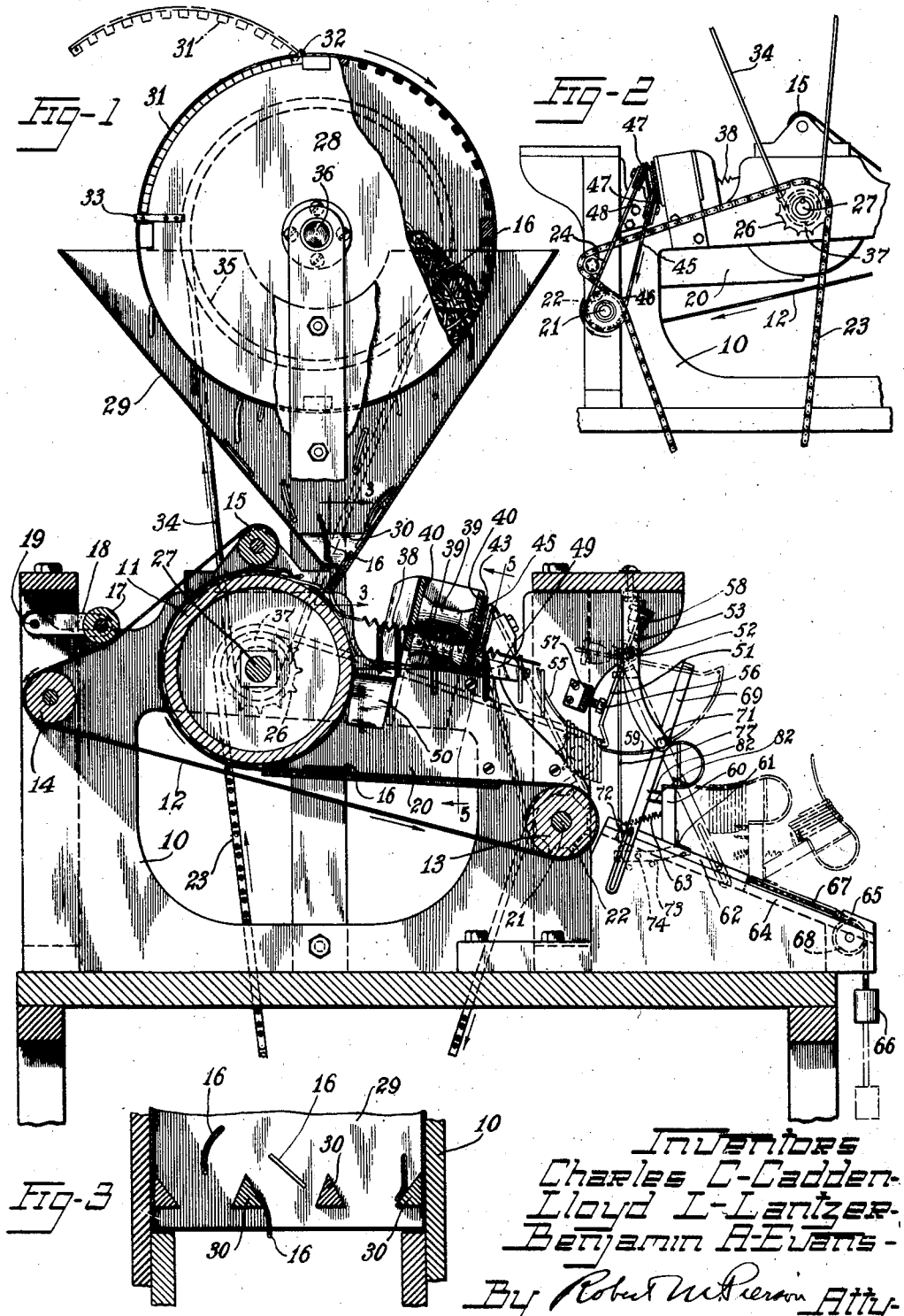

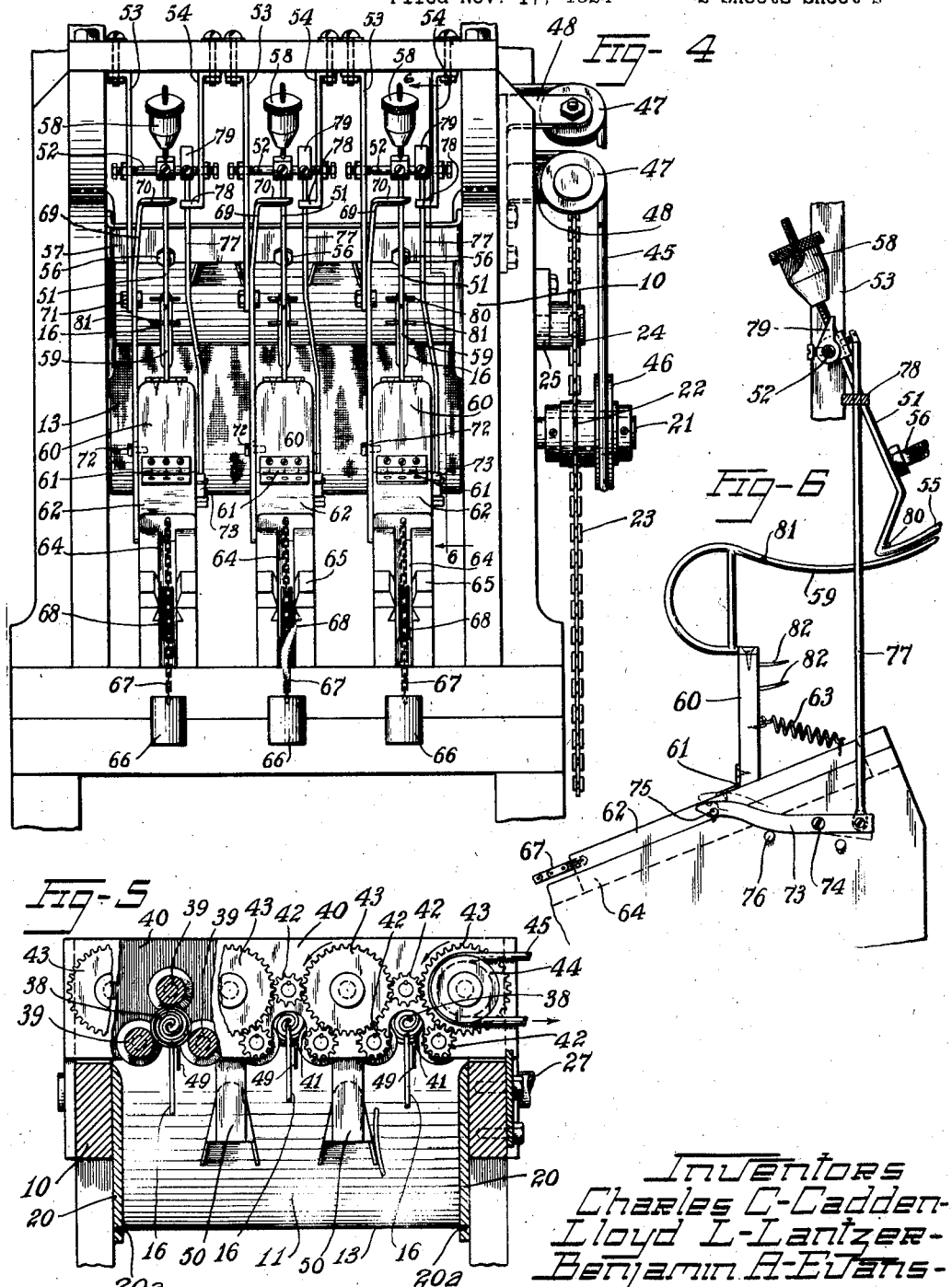

1,578,393

UNITED STATES PATENT OFFICE.

CHARLES C. CADDEN, OF AKRON, AND LLOYD L. LANTZER AND BENJAMIN A. EVANS, OF CUYAHOGA FALLS, OHIO, ASSIGNORS TO THE B. F. GOODRICH COMPANY, OF NEW YORK, N. Y., A CORPORATION OF NEW YORK.

METHOD AND APPARATUS FOR ARRANGING LOOPED ARTICLES.

Application filed November 17, 1924. Serial No. 750,259.

*To all whom it may concern:*

Be it known that we, CHARLES C. CADDEN, a citizen of the United States, residing at Akron, and LLOYD L. LANTZER and BENJAMIN A. EVANS, citizens of the United States, residing at Cuyahoga Falls, in the county of Summit and State of Ohio, have invented a certain new and useful Method and Apparatus for Arranging Looped Articles, of which the following is a specification.

This invention relates to the art of arranging articles in determinate relation, as in collecting them in orderly arrangement or in determinate quantities, and is especially applicable to articles having a looped portion such as an eye or other form of loop adapted for the reception of a manipultaing member, the present invention being an improvement upon that described and claimed in the copending application of Charles C. Cadden, Serial No. 749,099, filed November 10, 1924.

The chief objects of the present invention are to provide for more rapid, accurate and automatic operation in the arranging of such articles, and more especially to provide improved means for controlling the supply of articles to the assembling mechanism and for dividing the succession of articles into determinate assemblies.

Of the accompanying drawings:

Fig. 1 is a vertical section of a machine embodying and adapted to carry out our invention in its preferred form, part of the feed drum being sectioned in a different plane and broken away.

Fig. 2 is a rear elevation of a portion of the same, on a somewhat smaller scale.

Fig. 3 is a section on line 3—3 of Fig. 1.

Fig. 4 is an elevation of a portion of the machine, from the right of Fig. 1.

Fig. 5 is a section on line 5—5 of Fig. 1, parts being sectioned in a different plane and broken away.

Fig. 6 is a section on line 6—6, of Fig. 4.

Referring to the drawings, the machine comprises a frame 10 in which is journaled a carrier roll 11, adapted to be driven, clockwise as viewed in Fig. 1, and to drive an endless carrier belt 12 so mounted upon an end roll 13 and guide rolls 14, 15 as to cause a reach of the carrier belt to pass horizontally onto the carrier roll at the lowest part of its orbit, the belt thus being adapted to catch articles, such as the rubber bands 16, 16 here shown, as they fall from the rotating carrier roll, and carry them upward between the belt and the roll as shown, so that, as the belt leaves the roll at the top of the latter's orbit, the rubber bands will be carried farther forward by the rotating roll, such of them as are not caught by a collecting device hereinafter described then falling again onto the carrier belt, to be again carried through the cycle. The guide rolls 14, 15 for the carrier belt are loosely journaled in the frame 10, and 17 is a tightener roll for the belt, loosely journaled between a pair of arms, one of which is shown at 18, pivoted on the frame at 19. 20, 20 are side plates secured to the frame 10 and formed with respective slots 20$^a$, 20$^a$, in which the margins of the carrier belt travel, to prevent the bands from falling therefrom.

The end roll 13 of the carrier belt is secured upon a shaft 21, upon which is loosely journaled a sprocket 22, at the rear of the machine, and a sprocket chain 23, running from suitable driving means (not shown), is mounted upon said sprocket, a guide sprocket 24 journaled upon a bracket 25 projecting from the rear of the frame, and a sprocket 26 secured upon the shaft 27 of the carrier roll 11.

For feeding the rubber bands at a suitable rate onto the carrier roll 11, a driven feeder drum, 28, having a cylindrical wall formed as a grating, is journaled in a hopper 29 which is bridged, near its delivery aperture, by a plurality of wedge shaped guides, 30, 30, (see Fig. 3), adapted to direct the rubber bands into spaced apart columns as they sift through the grating of the drum 28 and fall through the hopper 29 onto the carrier roll 11. One portion of the grating of the drum 28 is formed as a door 31 hinged at 32, Fig. 1, and provided with a latch 33, to receive the supply of rubber bands, and the drum is adapted to be slowly driven by a belt 34 mounted upon a pulley 35 secured to the drum's shaft 36 and upon a pulley 37 loosely journaled upon the shaft 27 of the carrier roll 11 and secured to the sprocket 26.

For picking off successive bands 16 from the carrier roll, at each column of bands, and transferring them in orderly relation, a conveyor screw 38, which is of greatest diameter at its middle and terminates at each end in a straight, axial portion, is mounted in an inclined position, for its adjacent straight end portion to enter successive rubber bands as the latter pass to it on the carrier roll 11, said screw in its inclined position being adapted for the bands to slide down said straight end portion, to be fed along by the helical portion of the screw to its other straight end portion, and to slide down and pass from the end of said portion, as the screw rotates, the bands hanging vertically from the screw as they are thus transferred.

Each of the conveyor screws 38 is supported and adapted to be peripherally driven by three waisted rollers 39, 39 embracing the relatively large middle portion of the screw so as to prevent axial displacement thereof, said rollers being journaled between a pair of plates 40, 40 bridging the frame 10 and formed at their lower edges with notches such as are shown at 41, 41, Fig. 5, to permit the passage of the bands supported on the screws. For driving said waisted rollers the journal of each projects beyond one of the plates 40 and has secured thereon a spur gear 42, the several spur gears being so intermeshed with a series of idler gears 43, 43, mounted upon the plate, as to be driven thereby, all in the same direction, clockwise as viewed in Fig. 5, to drive the screws counter-clockwise as there viewed, one of the gears 43, at the end of the series, having secured thereto a belt pulley 44 adapted to be driven by a belt 45 running from a pulley 46 secured to the sprocket 22, said belt passing over guide pulleys 47, 47 journaled on brackets 48, 48 projecting from the rear of the machine.

To prevent the rubber bands from being carried around through the orbit of the screw, and so compel them to be fed along by the screw, an L-shaped plate 49, parallel with the axis of the screw, is secured to the front face of the forward plate 40 and extends along and beneath the respective screw in position to stop the bands if they start to climb with the rotating screw. (See Figs. 1 and 5). Supported from the same plate 40 at positions between adjacent screws are wedge-shaped guides 50, 50 (see Figs. 1 and 5), positioned below the screws and closely adjacent the carrier roll 11, for keeping the bands which are not intercepted by the screws in column formation as they fall upon the carrier belt 12, so that as they pass again over the carrier roll they will be concentrated at the positions of the screws, to assure that a suitable number of them will be engaged by the screws.

For receiving the bands in orderly relation from the screws and weighing them into successive assemblies adapted to be bundled or packed, a lever 51 adjacent each screw is secured to a horizontal fulcrum shaft 52 having pointed ends, as shown in Fig. 4, said shaft being mounted between a pair of brackets 53, 54, said lever being formed at its lower end with an arcuate collecting hook 55 substantially concentric with the lever's fulcrum shaft 52, the terminus of the hook being adapted to take a position just under the delivery end of the screw 38, to enter the rubber bands as the latter pass off the end of said screw, while the lever is held against an adjustable stop 56 screwed into a cross brace 57 spanning the frame 10, by an adjustable over-center weight 58 screwed onto the upper arm of said lever. The greater part of the hook 55 is at the band-receiving side of the straight portion of the lever, in order that an imaginary line from the center of gravity of a file of bands on said hook to the center of the fulcrum shaft 52 will form an angle of less than 180° with a line running from the center of said fulcrum shaft to the center of gravity of the weight 58, the lever and over-center weight thus being adapted to act as a dump scale.

For receiving each file or hookful of bands as they are dumped from the hook 55, a conveying hook 59 is mounted upon a vertical arm 60 hinged at 61 upon a slide 62, said arm being urged toward an upright position, in which it is stopped by its lower end face abutting the slide, by a pull spring 63 connecting it with the slide, on the side next to the collecting devices. Each slide 62 is mounted in an inclined dove-tail guide 64 secured upon the frame 10 and is urged downward and away from the collecting devices, toward a stop block 65 mounted on said guide, by a weight 66 connected with the slide by a chain 67 running over a pulley 68 journaled on the lower end of the guide.

The conveying hook is so formed that when the arm 60 is in its vertical position and the slide 62 is at the top of its range, the band-receiving portion of said hook will be approximately concentric with the fulcrum shaft 52 of the collecting hook 55, and the free end of the conveying hook will be positioned just under the base portion of the collecting hook, so that it will enter the bands of the file as the latter are swung, in a direction away from the collecting screws, by the dumping movement of the lever 51 with its collecting hook 55, the collecting hook having sufficient range in its dumping movement to transfer a complete file of bands to the conveying hook and withdraw completely from them, so that the conveying hook, on its slide, may be freely withdrawn, with the bands thereon, by the action of the weight 66.

For limiting the dumping movement of the collecting hook 55, and also for restoring it to collecting position, a lever 69 having an off-set upper end portion 70 adapted to engage the lower arm of the lever 51 is fulcrumed at 71 upon the lower end of the bracket 53, the lower arm of the lever being formed with a longitudinal slot in which is engaged a stud 72 projecting from the side of the slide 62, so that the said off-set portion of the lever will stop the dumping movement of the lever 51 when the slide is in its upper or band-receiving position, and will then swing the lever back to collecting position, the weight 58 passing over center, as the slide is drawn down its guide by the weight 66.

For holding the slide in its uppermost position, against the force of the weight 66, until the hook 55 is dumped, a latch lever 73 (see Fig. 6) is fulcrumed at 74 on the side of the guide 64 and is formed with a cam hook adapted to engage a stud 75 on the slide, said lever being adapted to rest of its own weight against a stop 76 projecting from the side of the slide. The other arm of said latch lever is pivoted to the lower end of a vertical push rod 77 having its upper end guided in an apertured lateral projection 78 formed on the lower end of the bracket 54, a trip finger 79 being secured upon the fulcrum shaft 52 and adapted to strike the top of said push rod near the end of the dumping movement of the collecting hook 55, to unlatch the lever 73 from the slide and permit it to convey away the file of bands just delivered to the conveying hook 59 thereon. Devices such as the crosspins 80, 81 are preferably provided at the bases of the collecting hook and the delivery hook respectively, to be abutted by the end bands of each file and thus position the file upon the hook and prevent its disarrangement. Spurs such as are shown at 82, 82, at different positions for rubber bands of different lengths may be mounted upon the arm 60 to prevent the file of bands from lifting and following along with the collecting hook as the latter swings past the conveying hook in its dumping movement, and to prevent oscillation or misalignment of the file of bands.

In the operation of the machine, a supply of the bands 16 being placed in the feed-drum 28 and the door 31 of the latter closed, and the machine being driven, through the chain 23, the bands sift through the grating of the rotating drum and are directed into columns, at the positions of the several collecting and conveying screws 38, as they fall onto the rotating carrier roll 11. As they move forward on said roll, in continuous procession, to the collecting screws, such of them as are by chance suitably positioned pass onto the adjacent ends of the screws, which convey the bands to their opposite ends and there deliver them to the collecting hooks 55, the hanging bands passing through the notches 41 of the plates 40 and being prevented from rotating with the screws by the plates 49.

Bands not thus collected fall from the carrier roll 11 onto the carrier belt 12, their column formation being preserved by the guides 50, and are caused by the belt to pass again over the carrier roll.

When each collecting hook has received a sufficient quantity of bands to overbalance the weight 58, the hook quickly swings in its dumping movement, the center of gravity of the weight being more nearly aligned vertically with the fulcrum shaft 52, at the beginning of the dumping movement, than is that of the file of bands, so that the weight reaches a strongly dominant position as to leverage before the center of gravity of the file of bands reaches its lowermost position, with the result that the collecting hook continues to be swung until stopped by the off-set portion 70 of the lever 69.

Thus the file of bands is transferred to the adjacent conveying hook 59, the slide 62 being latched in its uppermost position, and just before the collector hook is stopped the finger 79 strikes the push rod 77, disengaging the latch lever 73 from the stud 75 (Fig. 6) and permitting the connected weight 66 to draw the slide down its guide 64 against the stop 65. During this movement of the slide the stud 72 thereon so actuates the lever 69 as to swing the collecting hook back to collecting position, the dumping and return movements of the hook being so quick that few if any bands fall from the conveyor screw onto the carrier belt 12. Those that do are carried back into the column of bands on the carrier drum 11 from which they came.

As each slide abuts its stop 65 the operator momentarily tilts the arm 60, against the force of its spring 63, and removes the weighed file of bands from the hook 59 and secures it as a bundle by means of one of the rubber bands, or otherwise unifies or disposes of it as a unitary assembly, and then returns the slide by hand, against the force of the weight 66, to its band-receiving position, before the band collecting hook dumps its next file of bands. A single operator may thus attend to the several units of the machine in rotation, and the handling of the bands is very rapid, the feed drum and the guides 30 and 50 being adapted to promote a regular as well as rapid delivery of the bands from the screws. The bands are not only given orderly arrangement but in the same, unitary operation are automatically divided into determinate assemblages.

We do not wholly limit our claims to the employment of the conveyor screw for catching the bands from the carrier roll and transferring them to the collector hook, but such transferring means is preferably interposed between the two in order that the collector hook may be subject to the weight or force of only such bands as are actually threaded thereon.

Modifications may be resorted to without departing from the scope of our invention, and we do not wholly limit our claims to the exact procedure or the specific construction shown and described.

We claim:

1. The method of arranging looped articles which comprises collecting said articles in file formation by engaging a collecting member in their loops, and sliding them in succession from said member to divide them into individual assemblages of determinate weight, the articles being weighed while in file formation to determine the points of division between successive assemblages.

2. The method of arranging looped articles which comprises holding a collecting member in a determinate position while so moving a supply of the articles in chance arrangement past the collecting member as to cause the latter to engage in the loops of some of the articles and receive the same in file formation, sliding the articles in succession from the opposite end of the collecting member to divide them into individual assemblages of determinate weight, the articles being weighed while in file formation to determine the points of division between successive assemblages.

3. Apparatus of the character described comprising a dump-scale device including a load-receiving member adapted to support a file of looped articles by engagement in their loops, and means for mounting successive looped articles on said member.

4. Apparatus of the character described comprising a dump-scale device including a load-receiving member adapted to support a file of looped articles by engagement in their loops, means for mounting successive looped articles in file formation on said member, and means adapted to receive the file of articles as the same are dumped by said device and to maintain them in orderly arrangement.

5. Apparatus of the character described comprising a dump-scale device including a load-receiving member adapted to support a file of looped articles by engagement in their loops, means for mounting successive looped articles in file formation on said member, and means adapted to enter the loops of said articles, as an incident of the dumping movement of said device, to maintain orderly arrangement of said articles as they are dumped by said movement.

6. Apparatus of the character described comprising a dump-scale device including a load-receiving member adapted to support a file of looped articles by engagement in their loops, means for mounting successive looped articles in file formation on said member, and means for receiving and conveying the articles in orderly arrangement as they are dumped by said device.

7. Apparatus of the character described comprising a lever having a weighted upper arm adapted to act with an over-center effect and a lower arm formed with an article-receiving hook portion curved substantially concentrically with relation to the fulcrum of said lever, means for stopping said lever in load-receiving and in dumped positions, said lever being so formed that, with the lever in load-receiving positions, the center of gravity of its lower arm and a file of looped articles hung on its hook portion will be farther from vertical alignment with the fulcrum of said lever than the center of gravity of the lever's weighted upper arm is from such alignment, to provide a dump-scale effect.

8. Apparatus of the character described comprising a dump-scale device including a pivoted member formed with a load-receiving hook portion adapted to support a file of looped articles by engagement in their loops, the load-receiving portion of said member being curved substantially concentrically with relation to said member's pivot, and a file-receiving member having a hook-portion adapted to be so positioned as to receive a file of the articles from said pivoted member as the latter turns on its pivot in a dumping movement, the hook-portion of said file-receiving member being so formed as to be substantially concentric with the pivot of said pivoted member when in file-receiving position.

9. Apparatus as defined in claim 8 in which the file-receiving member is so movably mounted as to be presented to the load-receiving hook-portion of the pivoted member in closely spaced, concentrically overlapped relation thereto, and to enter the loop of articles thereon in being so presented.

10. Apparatus of the character described comprising a dump-scale device including a load-receiving member adapted to support a file of looped articles by engagement in their loops, a movably mounted file-conveying member positionable adjacent said load-receiving member and adapted to receive a file of articles therefrom by engagement in their loops, as they are dumped by said load-receiving member, yielding means for urging said file-conveying member away from its file-receiving position, a latch for holding said file-conveying member in its file-receiving position, against the force of said yielding means, and means actuated by the dumping movement of said dump-scale device for releasing said latch.

11. Apparatus of the character described comprising a dump-scale device including a load-receiving member adapted to support a file of looped articles by engagement in their loops, means for mounting successive looped articles in file formation on said member, file-conveying means for receiving and conveying away a file of articles as the same are dumped by said device, and means for actuating said file-conveying means and restoring said load-receiving member to load-receiving position in timed relation to the dumping movement of said device.

12. Apparatus of the character described comprising a dump-scale device including a load-receiving member adapted to support a file of looped articles by engagement in their loops, movably mounted file-conveying means positionable adjacent said load-receiving member and adapted to receive a file of articles dumped therefrom, yielding means for urging said file-conveying means away from its file-receiving position, a latch for holding said file-conveying means in its file-receiving position, against the force of said yielding means, means actuated by the dumping movement of said dump-scale device for releasing said latch, and means actuated by the movement of said file-conveying means for restoring said load-receiving member to load-receiving position.

13. Apparatus of the character described comprising a plurality of adjacent dump-scale devices each including a load-receiving member adapted to support a file of looped articles by engagement in their loops, means for mounting looped articles at a substantially uniform rate upon the several load-receiving members, and respective devices associated with each of said dump-scale devices for conveying away the files of articles as they are dumped therefrom and supporting them in orderly arrangement for ready removal at the end of the conveying movement, each of the conveying devices being adapted to perform its conveying function automatically upon the dumping of the file thereon, and to remain away from its file-receiving position until returned thereto by the operator.

14. Apparatus as defined in claim 13 in which the means for mounting the looped articles upon the load-receiving members of the dump-scale devices comprises respective conveyor screw members each adapted to receive the articles by engagement in their loops at one end of the member and to pass the articles, pendently supported, to the opposite end of the member and there deliver them onto the associated load-receiving member.

15. Apparatus of the character described comprising a dump-scale device having a load-receiving member adapted to support a load of looped articles by engagement in their loops, conveyor means adapted to pass a continuous procession of the articles onto said load-receiving member, the said dump-scale device being adapted to divide the continuous procession of articles into assemblages of equal weight, and means for continuously replenishing the supply of articles on said conveyor means.

16. Apparatus of the character described comprising an article-receiving member adapted to support a file of looped articles by engagement in their loops, an orbital carrier member adapted to carry a supply of the articles in chance arrangement thereon in a cyclic path past said article-receiving member so as to cause some of said articles to pass thereonto, and means for continuously replenishing the supply of articles on said carrier member.

17. Apparatus as defined in claim 16 in which the replenishing means comprises a rotary sifter drum.

18. Apparatus of the character described comprising a rank of spaced apart article-receiving members each adapted to support a file of looped articles by engagement in their loops, an orbital carrier member common to said article-receiving members and adapted to carry a supply of articles in chance arrangement past the same so as to cause some of the articles to pass onto said article-receiving members, and means for arranging the articles on said carrier member in columns aligned with the positions of said article-receiving members.

19. Apparatus as defined in claim 18 in which the means for arranging the articles in columns comprises a hopper, over the carrier member, having column-forming guiding means for articles descending therein, and means for sifting the articles into said hopper.

20. Apparatus of the character described comprising an orbital carrier adapted to carry a supply of looped articles in chance arrangement thereon, a conveyor-screw adapted to engage some of the articles as they are so carried, and a member so disposed along said screw as to prevent the articles from rotating with the screw while permitting to be fed along by the screw.

In witness whereof we have hereunto set our hands this 6th day of November 1924.

CHARLES C. CADDEN.
LLOYD L. LANTZER.
BENJAMIN A. EVANS.